(12) United States Patent
Adachi et al.

(10) Patent No.: US 8,140,209 B2
(45) Date of Patent: Mar. 20, 2012

(54) PARKING ASSISTING DEVICE AND PARKING ASSISTING METHOD

(75) Inventors: Jun Adachi, Kariya (JP); Takashi Hiramaki, Kariya (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 953 days.

(21) Appl. No.: 12/094,096

(22) PCT Filed: Nov. 17, 2006

(86) PCT No.: PCT/JP2006/323029
§ 371 (c)(1),
(2), (4) Date: May 16, 2008

(87) PCT Pub. No.: WO2007/058325
PCT Pub. Date: May 24, 2007

(65) Prior Publication Data
US 2009/0118900 A1    May 7, 2009

(30) Foreign Application Priority Data
Nov. 17, 2005    (JP) .................................. 2005-333419

(51) Int. Cl.
*G01C 22/00* (2006.01)
*G06G 7/78* (2006.01)

(52) U.S. Cl. ................ 701/23; 701/25; 701/26; 701/41; 701/301

(58) Field of Classification Search .......................... None
See application file for complete search history.

(56) References Cited

U.S. PATENT DOCUMENTS

| | | | | |
|---|---|---|---|---|
| 5,726,916 | A | * | 3/1998 | Smyth ........................... 702/151 |
| 6,102,147 | A | * | 8/2000 | Shimizu et al. ............... 180/204 |
| 6,246,779 | B1 | * | 6/2001 | Fukui et al. .................... 382/103 |
| 6,738,705 | B2 | * | 5/2004 | Kojima et al. ................... 701/96 |
| 6,919,822 | B2 | * | 7/2005 | Tanaka et al. ............. 340/932.2 |
| 7,429,918 | B2 | * | 9/2008 | Watanabe ..................... 340/468 |
| 7,815,313 | B2 | * | 10/2010 | Ito et al. ........................... 353/13 |
| 2005/0128063 | A1 | * | 6/2005 | Isaji et al. ..................... 340/439 |

FOREIGN PATENT DOCUMENTS

JP       2001-018821 A      1/2001
(Continued)

OTHER PUBLICATIONS

Vestri et al. (C. Vestri, S. Bougnoux, R. Bendahan, K. Fintzel, S. Wybo, F. Abad and T. Kakinami, Evaluation of a Vision-Based Parking Assistance System , Proceedings of the 8th International IEEE Conference on Intelligent Transportation Systems, Vienna, Austria, Sep. 13-16, 2005, pp. 56-60).*

(Continued)

*Primary Examiner* — Khoi Tran
*Assistant Examiner* — Bao Long T Nguyen
(74) *Attorney, Agent, or Firm* — Sughrue Mion, PLLC

(57) ABSTRACT

A parking assisting device is equipped with a imaging device (1), a gaze position determining sections (3, 11), target parking position setting sections (1, 11), and a parking assisting section (2). The imaging device (1) takes images of surrounding of a vehicle. The gaze position determining sections (3, 11) determine positions at which a driver gazes. The target parking position setting sections (1, 11) sets target parking positions based on images taken by the imaging device (1) and gaze positions determined by the gaze position determining section (11). The parking assisting section (2) assists in processing to park the vehicle at the set target parking position.

12 Claims, 17 Drawing Sheets

FOREIGN PATENT DOCUMENTS

| | | |
|---|---|---|
| JP | 2001-199298 A | 7/2001 |
| JP | 2003-044996 A | 2/2003 |
| JP | 2003-115100 A | 4/2003 |
| JP | 2003-196017 A | 7/2003 |
| JP | 2004-034946 A | 2/2004 |
| JP | 2005-271866 A | 10/2005 |

OTHER PUBLICATIONS

Xu et al. (Jin Xu, Guang Chen and Ming Xie, Vision-Guided Automatic Parking for Smart Car, Proceedings of the IEEE Intelligent Vehicles Symposium 2000 Dearborn (MI), USA Oct. 3-5, 2000, pp. 725-730).*

* cited by examiner

PARKING ASSISTING DEVICE AND PARKING ASSISTING METHOD

CROSS REFERENCE TO RELATED APPLICATIONS

This application is a National Stage of International Application No. PCT/JP2006/323029 filed on Nov. 17, 2006, claiming priority based on Japanese Patent Application No. 2005-333419, filed Nov. 17, 2005, the contents of all of which are incorporated herein by reference in their entirety.

TECHNICAL FIELD

The present invention relates to technology for selecting a position and for setting the position as a target parking position in a straightforward manner, and specifically relates to technology for setting a target parking position based on the position gazed at by a driver.

BACKGROUND ART

A parking assisting device detects white lines photographed by a rear camera etc. and sets a target parking position. The parking assisting device makes an operation of parking to the rear straightforward by displaying a space indicating a target parking position on a display device (for example, patent document 1).

Patent Document 1: Unexamined Japanese Patent Application KOKAI Publication No. 2004-34946

DISCLOSURE OF INVENTION

Problems to be Solved by the Invention

With parking assisting devices of the related art, when a number of possible parking positions exist, the driver selects one of the positions. It is necessary to set the selected position to the parking assisting device as a target parking position. This setting operation is complex and places a substantial burden on the driver. It is therefore feared that use of the parking assisting device itself will be avoided.

In order to resolve the above problem, it is an object of the present invention to provide a parking assisting device and method where setting of a position targeted for parking can be carried out in a straightforward manner. In order to resolve the above problem, it is a still further object of the present invention to provide a parking assisting device and method that is easier to use or more user-friendly.

Means for Resolving the Problems

In order to achieve the above object, a parking assisting device of a first aspect of the present invention comprises:

imaging means that takes images of surrounding of a vehicle, gaze position determining means that determines a gaze position at which a driver gazes;

target parking position setting means that sets a target parking position based on images taken by the imaging means and the gaze position determined by the gaze position determining means, and parking assisting means that assists in processing to park the vehicle at the target parking position set by the target parking position setting means.

It is also possible to provide possible parking position determining means that detects at least one parking space from the images taken by the imaging means, obtains a parking section area using the detected parking spaces, and determines whether or not it is possible to park the vehicle within the obtained parking section area.

The target parking position setting means can then set a parking section position on a position determined to be a position at which the driver gazes, of the parking section areas where parking is determined to be possible by the possible parking position determining means, as the target parking position.

Parking section area detecting means that detects parking section areas where it is possible for a vehicle to park can also be provided.

When the parking section area detecting means detects a plurality of parking section areas, the target parking position setting means sets a parking section area on the gaze position determined by the gaze position determining means from a plurality of possible parking positions as the target parking position.

It is also possible to provide parking starting means that inputs an instruction to start parking;

storage means that determines movement of a vehicle in a process where the vehicle achieves a retreated state from the input of an instruction to start parking and stores the movement; and relative position acquiring means that acquires a relative position of the vehicle position at the time when the gaze position determining means determines the gaze position, with respect to the vehicle position at the time when the vehicle is in a retreated state.

The target parking position setting means selects a position from a plurality of possible parking positions and sets the selected position as the target parking position based on the gaze position determined by the gaze position determining means and the relative position.

The parking assisting means can further comprise any of:

means that displays the target parking position;

guidance means that guides the vehicle to the set target parking position; and automatic steering means that controls the vehicle to automatically travel as far as the target parking position.

It is also possible for the target parking position setting means to comprise switching operation means that switches the selected target parking position to other possible parking position.

The gaze position determining means can also comprise:

internal imaging means that takes images of a space in the vehicle including the face of the driver; and gaze position calculating means that obtains a position at which the driver gazes from the images of the driver taken by the imaging means.

It is also possible to provide parking starting means for inputting an instruction to start parking;

storage means that stores movement of a vehicle in a process where the vehicle achieves a retreated state from the start of parking; and relative position acquiring means that acquires a relative position of the vehicle position at the time when the gaze position determining means determines the gaze position, with respect to the vehicle position at the time when the vehicle is in a retreated state.

The target parking position setting means then selects a position from a plurality of possible parking positions based on the gaze position determined by the gaze position determining means and the relative position.

There may also be provided display means that displays images taken by the imaging means.

The display means can then display a parking section area set as the target parking position by the target parking position setting means in an emphasized manner.

It is also possible to provide display means that displays images for a plurality of parking section areas taken by the imaging means and displays one of the plurality of parking section areas in an emphasized manner;

emphasis target switching means that switches over a emphasis target; and target setting operation means.

The display means switches over emphasized parking section area in response to the operation of the emphasis target switching means.

The target parking position setting means can then set the parking section area displayed in an emphasized manner at this time as the target parking position in response to operation of the emphasis target switching means.

In order to achieve the above object, a parking assisting method of a second aspect of the present invention comprises:

taking images of surrounding of a vehicle;

determining a gaze position at which a driver gazes;

setting a target parking position based on taken images and a determined gaze position; and outputting information for guiding driving to enable parking at the set target parking position, or controlling the vehicle to travel automatically to the target parking position.

In order to achieve the above object, a parking assisting device of a third aspect of the present invention comprises:

obstacle detecting means that detects position information of obstacles of surrounding of the vehicle;

gaze position determining means that determines a gaze position at which a driver gazes;

target parking position setting means that sets the target parking position based on position information for the obstacles detected by the obstacle detecting means and the gaze position determined by the gaze position determining means; and parking assisting means that assists in processing to park the vehicle at the target parking position set by the target parking position setting means.

Effects of the Invention

According to the present invention, a target parking position can be set based on the gaze position at which a driver gazes. Therefore setting of the target parking position is straightforward by the present invention.

DESCRIPTION OF NUMERALS

Figure 1:
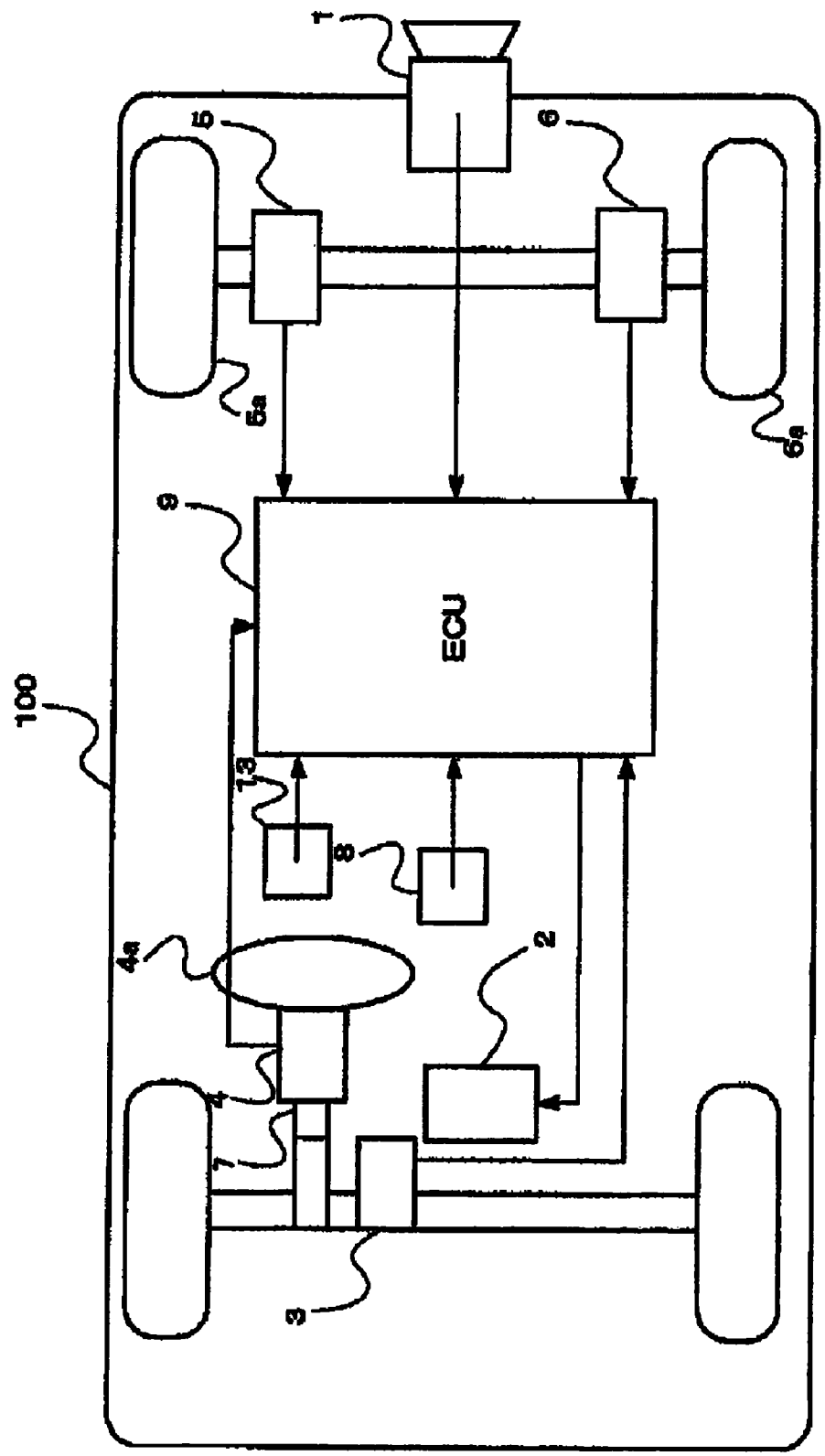
FIG. 1 A view of an overall structure for a vehicle mounted with a parking assisting device of a first embodiment of the present invention.

1 Rear Camera (external imaging means)
2 display device (target parking position display means, display means)
3 indoor camera (gaze position acquiring means)
4 steering angle sensor
4a steering wheel
5 right rear wheel speed sensor
5a right rear wheel
6 left rear wheel speed sensor
6a left rear wheel
7 steering actuator
8 reverse position sensor
9 ECU (Electronic Control Unit)
10 ROM (Read Only Memory)
11 CPU (Central Processing Unit) (gaze position acquiring means, parking target position determining/setting means, possible parking position determining/setting means, relative position acquiring means, gaze position calculating means)
12 RAM (Random Access Memory) (storage means)
13 parking switch (parking starting means)
14 parking position deciding switch
15 reset switch
20 target parking space
21 parking space
22 parking section area
30 selection key
32 ultrasonic sensor (obstacle detecting means)

BEST MODE FOR CARRYING OUT THE INVENTION

First Embodiment

The following is a description with reference to the drawings of a parking assisting device of a first embodiment of the present invention.

As shown in FIG. 1, a vehicle 100 equipped with the parking assisting device of the first embodiment of the present invention is provided with a rear camera 1, a display device 2, an indoor camera 3, a steering angle sensor 4, a steering wheel 4a, a right rear wheel speed sensor 5, a right rear wheel 5a, a left rear wheel speed sensor 6, a left rear wheel 6a, a steering actuator 7, a reverse position sensor 8, an ECU (Electronic Control Unit) 9, a ROM (Read Only Memory) 10, a CPU (Central Processing Unit) 11, a RAM (Random Access Memory) 12, and a parking switch 13.

The rear camera 1 is constituted by a CCD camera etc., is installed to the rear at substantially the center of the vehicle 100, and takes images of surrounding, and specifically to the rear, of the vehicle 100.

The display device 2 is arranged to the front of the drivers seat and displays images taken by the rear camera 1 and a space indicating a parking position explained in the following in a superimposed manner.

The indoor camera 3 is constituted by a CCD camera etc., and mainly takes images within the vehicle including the face of the driver.

The steering angle sensor 4 is a sensor that detects an angle of rotation of the steering wheel 4a.

The right rear wheel speed sensor 5 is arranged at the right rear wheel 5a and the left rear wheel speed sensor 6 is arranged at the left rear wheel 6a. The sensors operate in cooperation with the ECU 9 and detect vehicle movement distances and current conditions of the vehicle 100.

The steering actuator 7 steers the front wheel of the vehicle. The steering actuator 7 is capable of automatically steering the steering wheel 4a until the vehicle 100 automatically reaches the target parking position under the control of the ECU 9.

The reverse position sensor 8 detects that a position of a gear shift lever has entered a reverse position or that a transmission has entered a reverse position and provides an instruction to the ECU 9.

Figure 2:
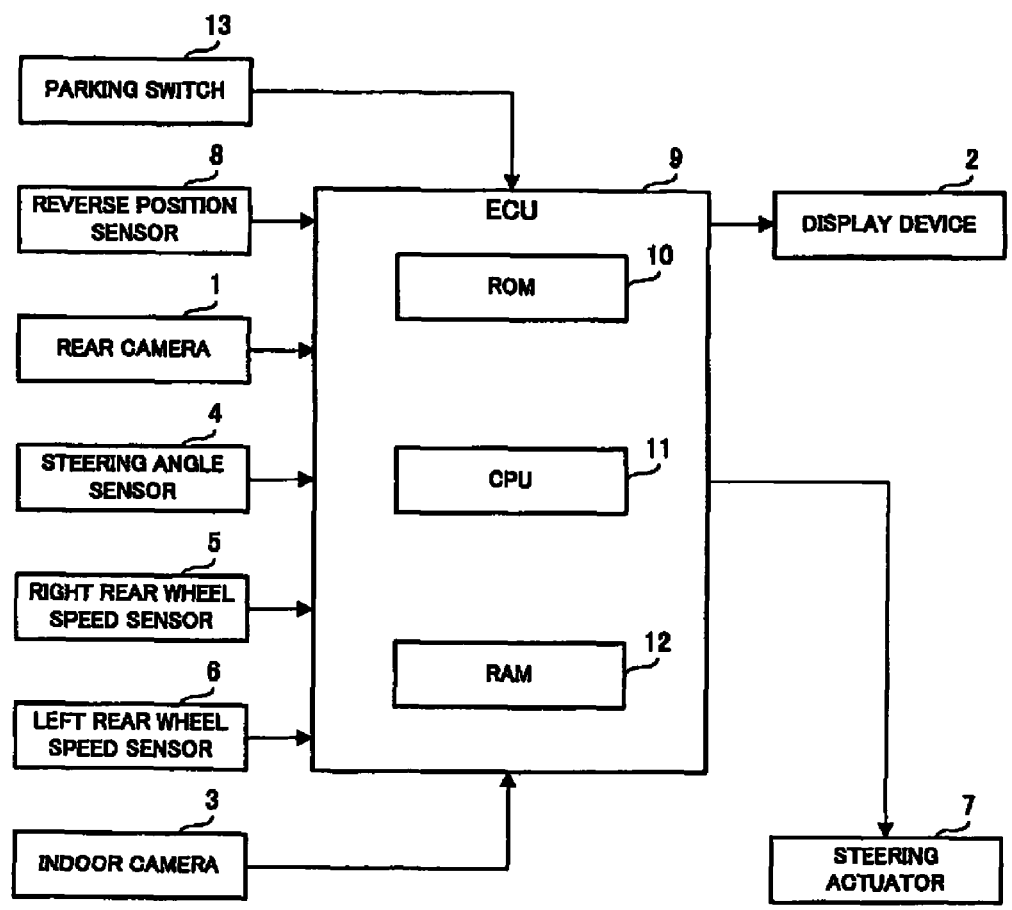
FIG. 2 A block diagram showing the relationship of the connection of equipment of the vehicle shown in FIG. 1 and an ECU.

The ECU 9 is a control device for controlling a parking operation of the vehicle 100 and particularly controlling a reverse parking operation. As shown in FIG. 2, the ECU 9 is constituted by the ROM 10, the CPU 11, and the RAM 12.

When the parking switch 13 is pressed, the ECU 9 outputs an instruction to take images of the face of the driver to the indoor camera 3. The ECU 9 then detects the orientation of the face and the line of sight of the face by analyzing images of the face of the driver taken by the indoor camera 3. The ECU 9 then obtains the position at which the driver gazes from the results of detection, and stores the position in the RAM 12. Further, the ECU 9 receives a reverse signal from the reverse position sensor 8 and displays images of to the rear of the vehicle taken by the rear camera 1 at the display device 2.

The ROM 10 stores a control program for controlling the overall operation of the parking assisting device, fixed parameters used in control, and, for example, a gaze position confirmation time TS. The gaze position confirmation time TS is a standard time that should keep gazing in order to determine that an arbitrary position is a gaze position.

The CPU 11 executes control intended for execution by the ECU 9 by executing a control program stored in the ROM 10.

The RAM 12 functions as a work area for the CPU 11. For example, the RAM 12 stores information such as image data for images taken by the indoor camera 3, the direction at which the driver gazes, coordinates of a gaze position, steering angle information indicating a steering angle, and speed information indicating speed, etc.

The parking switch 13 is a switch that can be pressed by the driver. When the driver presses the parking switch 13, the ECU 9 determines a gaze position at which the driver gazes using parking position storage processing described later and stores the position in the RAM 12.

Next, a description is given of the operation of the parking assisting device of the above structure using flowcharts and drawings illustrating the operation.

Figure 9:
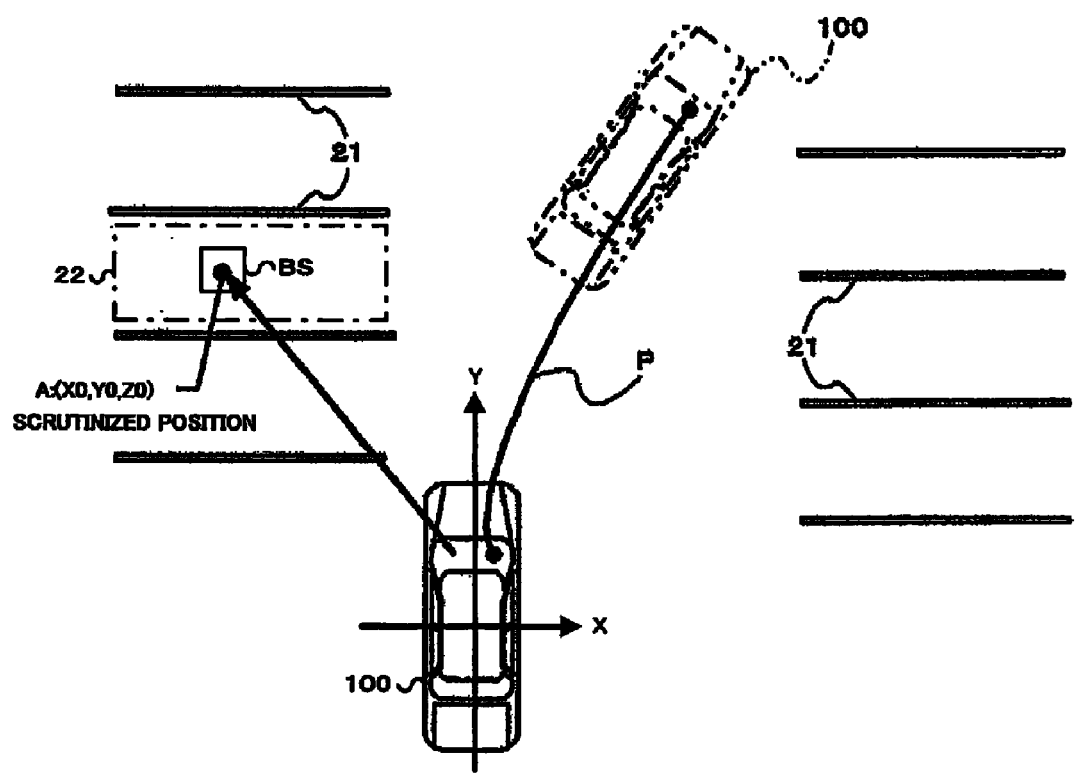
FIG. 9 A view illustrating gaze position storage processing shown in FIG. 4.

First, it is assumed, as shown in the example in FIG. 9, that the driver advances the vehicle 100 close to a position it is wished to park in a parking area etc. and turns the parking switch 13 on. The driver then gazes at one parking area of the parking areas it is wished to park in (a section area it is wished to park in of section areas defined by parking spaces 21 constituted by pairs of white lines) for a fixed period of time. After this, the driver enters a normal parking operation, advances the vehicle 100 to a position to the front of the section area it is wished to park in (a position shown by the dotted and dashed line in FIG. 9), and puts the gear into reverse. The driver then parks the vehicle 100 in a parking section area 22 the driver wishes to park in accordance with guidance of the parking assisting device. For example, the parking assisting device guides the vehicle 100 until the vehicle 100 is within the parking section area 22 using a guidance sound etc.

The CPU 11 reads out a parking assisting device control program for controlling the parking assisting device from the ROM 10 and executes parking assisting device control processing.

Figure 3:
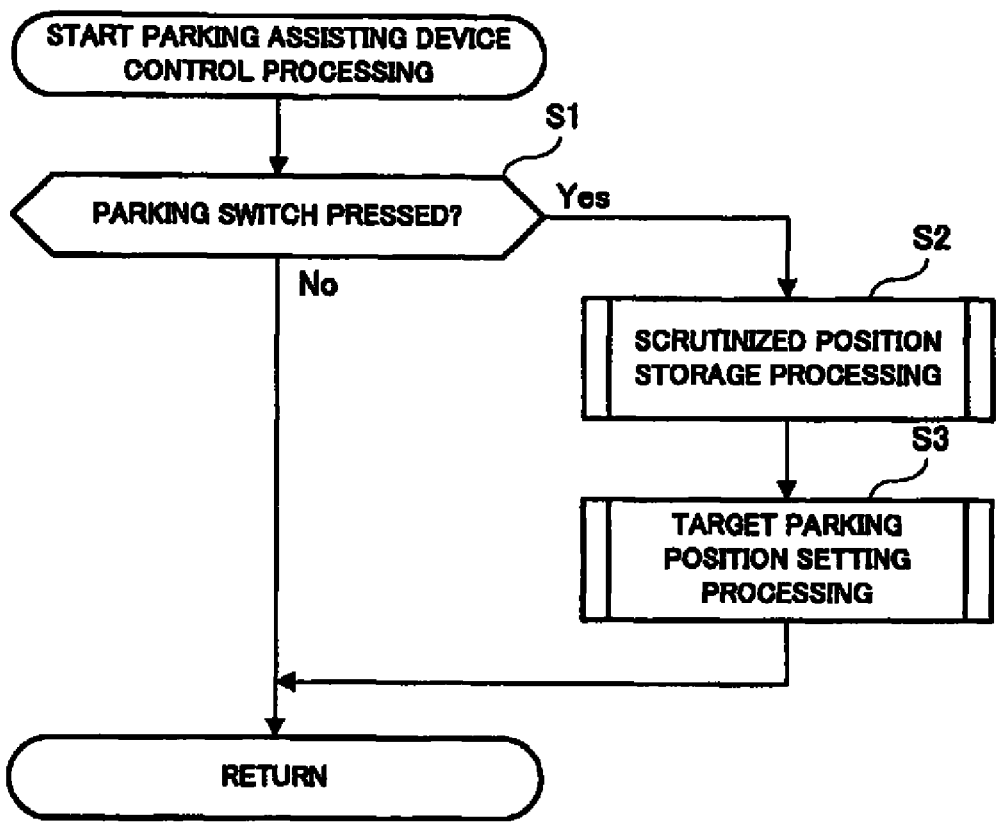
FIG. 3 A flowchart illustrating parking assisting device control processing of the first embodiment of the present invention.

FIG. 3 is a flowchart showing parking assisting device control processing. This processing is executed using main processing executed repeatedly by the CPU 11. First, the CPU 11 determines whether or not the driver has pushed down the parking switch 13 (step S1). If the driver has not pushed down the parking switch 13 (step S1: NO), the CPU 11 moves control to the main flow. If the driver presses down the parking switch 13 (step S1: YES), the CPU 11 executes gaze position storage processing (step S2) and executes target parking position setting processing (step S3). After executing the target parking position setting processing (step S3), the CPU 11 moves control to the main flow.

Next, a description is given of gaze position storage processing (step S2). The gaze position storage processing (step S2) is processing that determines a gaze position at which a driver gazes and stores the gaze position in the RAM 12.

Figure 4:
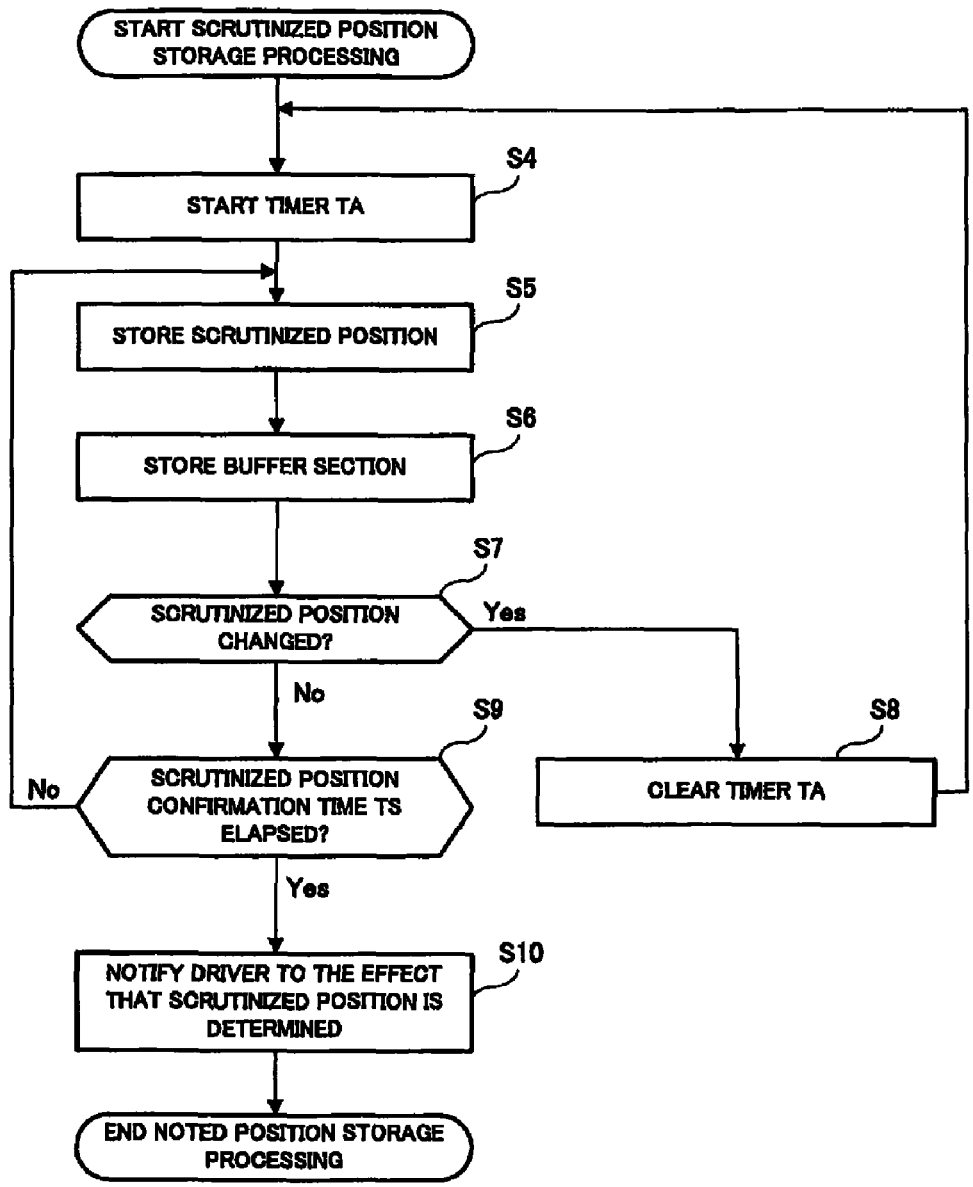
FIG. 4 A flowchart illustrating gaze position storage processing of the first embodiment of the present invention.

A flowchart of the gaze position storage processing executed by the CPU 11 is shown in FIG. 4. In the gaze position storage processing (step S2), the CPU 11 first starts a gaze time timer TA. The gaze time timer TA is an internal timer that measures the time the driver gazes at a parking section of a predetermined range. For example, the gaze time timer TA measures time in 0.1 second units (step S4).

The CPU 11 then detects the position (gaze position) at which the driver gazes (step S5). The method of detecting the gaze position is arbitrary, for example, as shown in FIG. 9, world coordinates (where a widthwise direction of the vehicle is taken to be an X-axis and a main shaft direction of the vehicle is taken to be a Y-axis) are set taking the center of the vehicle 100 as an origin, and this position is stored in the RAM 12. The direction at which the driver gazes is obtained from the orientation of the face of the driver, the position of the eyes, and the position of a light source of the indoor camera 3 etc. using a publicly known method. Further, coordinates A(X0, Y0, Z0) of an intersection point of this gaze direction and the ground surface are stored in the RAM 12 as a gaze position.

The CPU 11 then reads out the gaze position from the RAM 12 and takes a predetermined section (for example, 1 square meter) centered on this gaze position as a buffer section BS. The CPU 11 then stores coordinates of the four corners of the buffer section BS in RAM (step S6).

The CPU 11 then detects the gaze position again and reads out the coordinates of the buffer section BS from the RAM 12. It is then determined whether or not the gaze position is of coordinates outside of the buffer section BS (step S7). If the coordinates are outside the buffer section BS (step S7: YES), the CPU 11 determines that the gaze position has changed and clears the gaze time timer TA (step S8). The CPU 11 then returns to step S4 after step S8.

If it is determined that the gaze position is not of coordinates outside the buffer section BS determined in step S6 (step S7: NO), the CPU 11 reads out the gaze position confirmation time TS from the ROM 10. The CPU 11 then determines whether or not the time measured by the gaze time timer TA is such that the gaze position confirmation time TS has elapsed (step S9). When the time measured by the gaze time timer TA is less than the gaze position confirmation time TS (step S9: NO), the CPU 11 returns to step S5.

If the time measured for the gaze time timer TA is greater than or equal to the gaze position confirmation time TS, i.e. when the driver continues to gaze at a position within the buffer section BS for TS or more (step S9: YES), the CPU 11 stores the center coordinates of the buffer section BS as a gaze position in the RAM 12. The CPU 11 then notifies the driver that a gaze position is determined (step S10) and goes to control of the parking target position setting processing (step S3). For example, the CPU 11 notifies the driver by displaying a message of "gaze position decided" on the display device 2. Alternatively, the driver can be notified using sound.

As described above, in the gaze position storage processing (step S2), the driver gazes at the section it is wished to park in for a fixed time (for example, three seconds). In doing so, a message of "gaze position decided" is displayed on the display device 2. When the driver then wishes to park without changing the gaze position, the driver enters a normal parking operation, advances the vehicle 100 to a position to the front of the section area it is wished to park in, and puts the gears into reverse. If the driver wishes to change the section to park in, the driver presses down the parking switch 13 once again and gazes at the section it is wished to park in.

Figure 5:
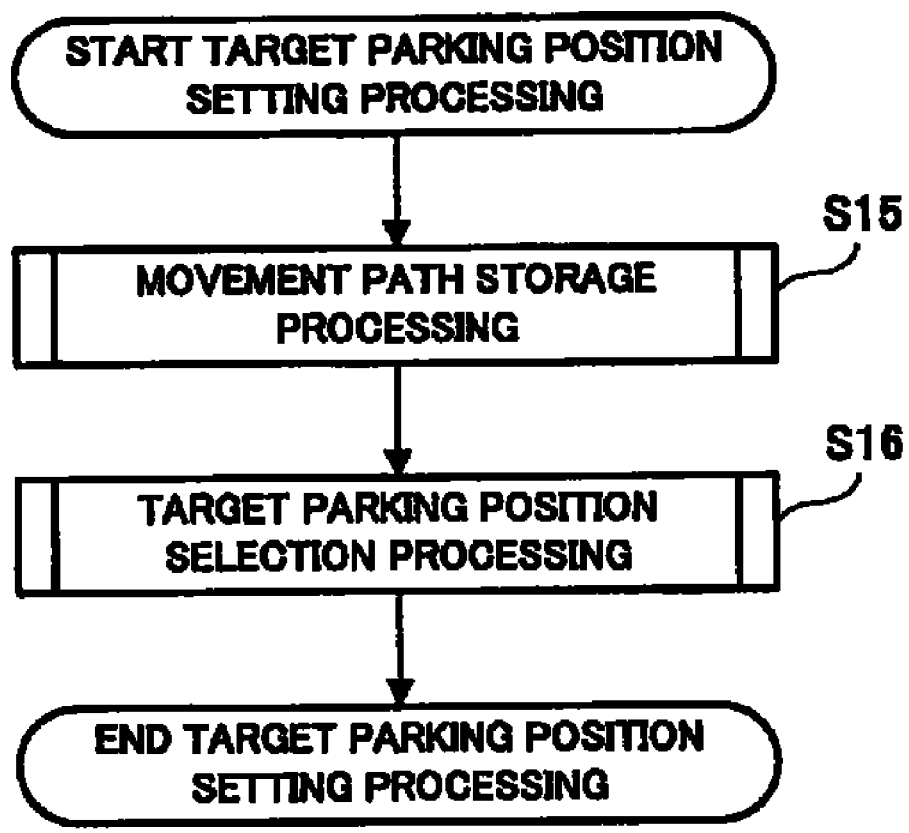
FIG. 5 A flowchart illustrating target parking position setting processing of the first embodiment of the present invention.

A description is given of the target parking position setting processing (step S3) with reference to FIG. 5. The target parking position setting processing (step S3) is processing for obtaining coordinates of a parking position for providing parking assistance to the driver. The CPU 11 first executes movement path storage processing (step S15), and then executes target parking position selection processing (step S16).

Figure 6:
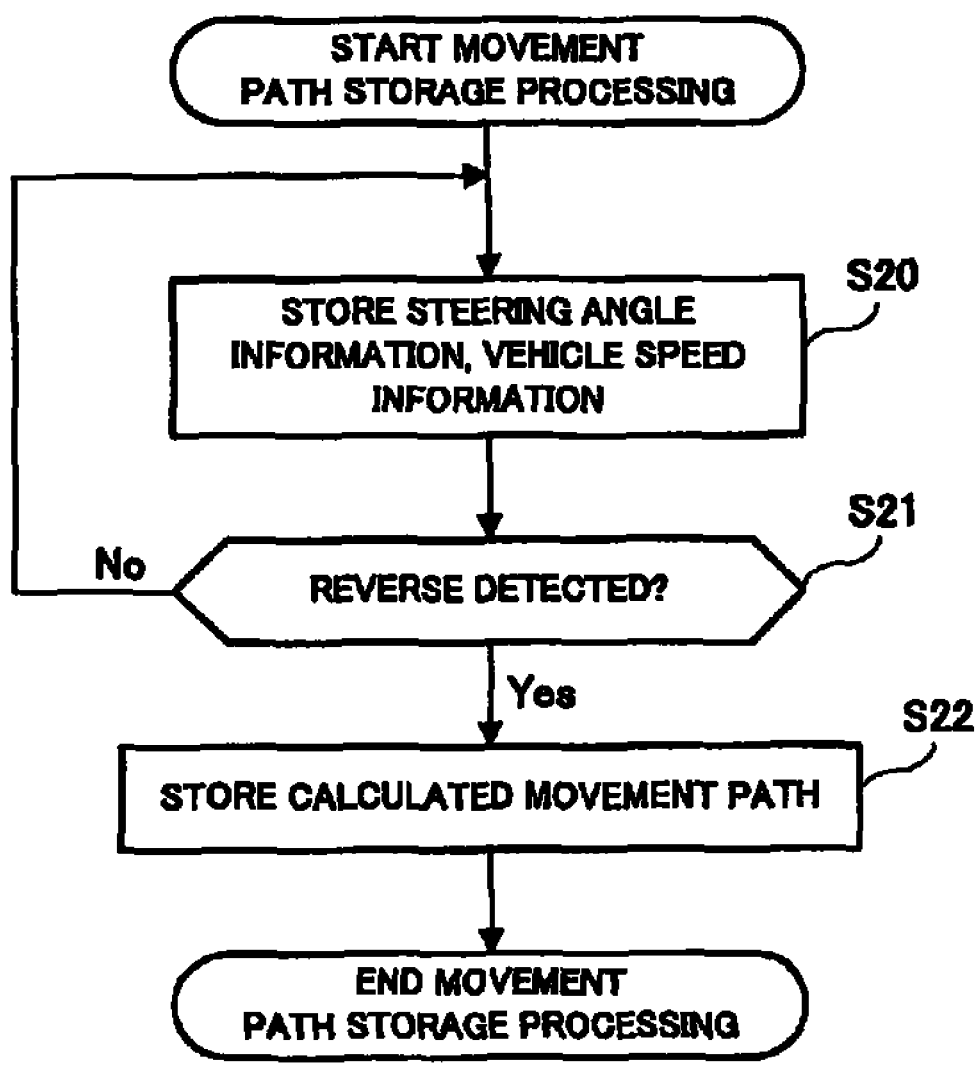
FIG. 6 A flowchart illustrating movement path storage processing shown in FIG. 5.

FIG. 6 is a flowchart of movement path storage processing executed by the CPU 11. The CPU 11 first stores steering angle information and speed information for the vehicle 100 in the RAM 12 (step S20).

The CPU 11 then determines whether or not to put the gears into reverse (step S21). The CPU 11 then repeats the processing of step S20 until there is notification that the gears have been put into reverse and stores the steering angle, speed information and vehicle data for the vehicle 100 in the RAM 12. Namely, the information obtained for the movement of the vehicle 100 from determination of the gaze position is stored in the RAM 12.

Figure 11:
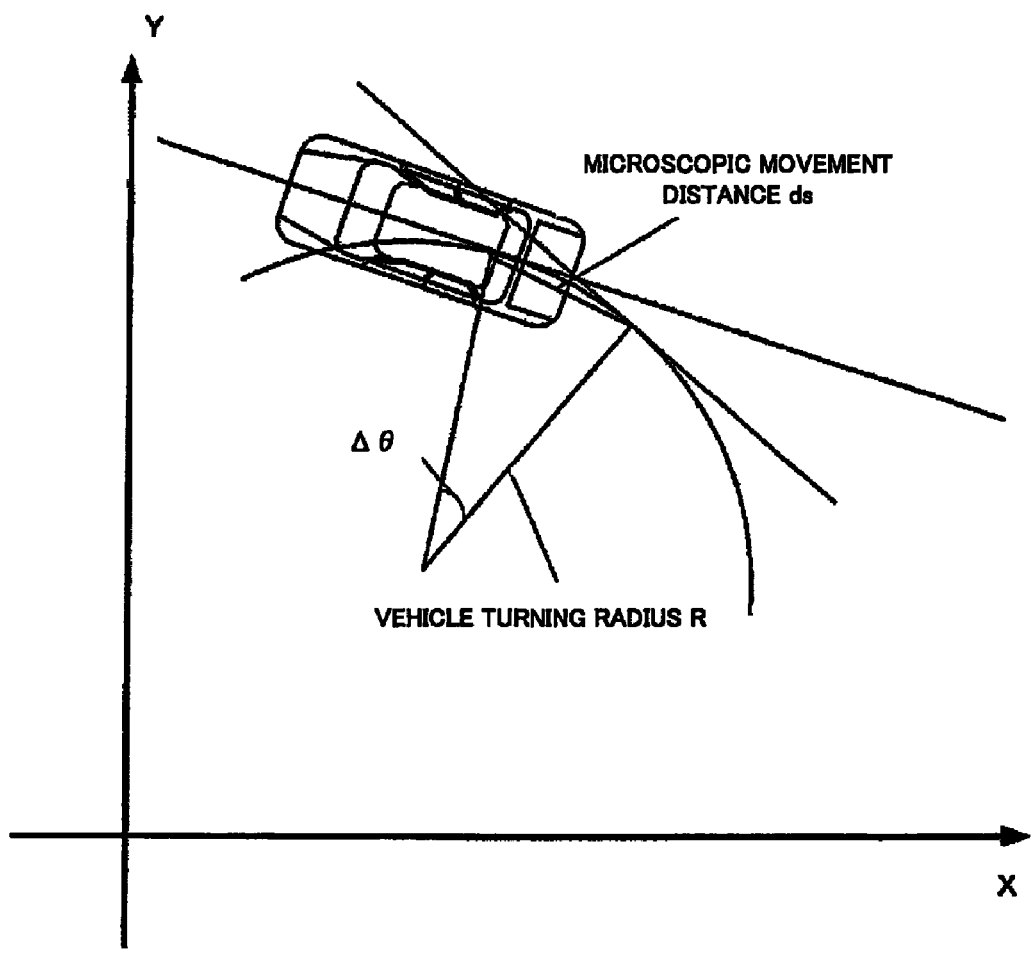
FIG. 11 A view illustrating movement path storage processing shown in FIG. 6.

If it is determined that the gears are put into reverse (step S21: YES), the CPU 11 moves control to step S22. The CPU 11 then calculates a movement path P for the vehicle 100 by determining the gaze position from the steering angle information, speed information, and vehicle data stored in the RAM 12 in step S20 and stores the results in the RAM 12 (step S22). As shown in FIG. 11, the distance moved at the time of vehicle movement is then obtained by integrating a microscopic movement distance ds on a vehicle turning radius R for a turning angle θ. The movement path P is then obtained from this movement distance, the vehicle position, and the turning angle.

In the above, the movement path storage processing of FIG. 6 ends and the target parking position selection processing of step S16 begins.

Figure 7:
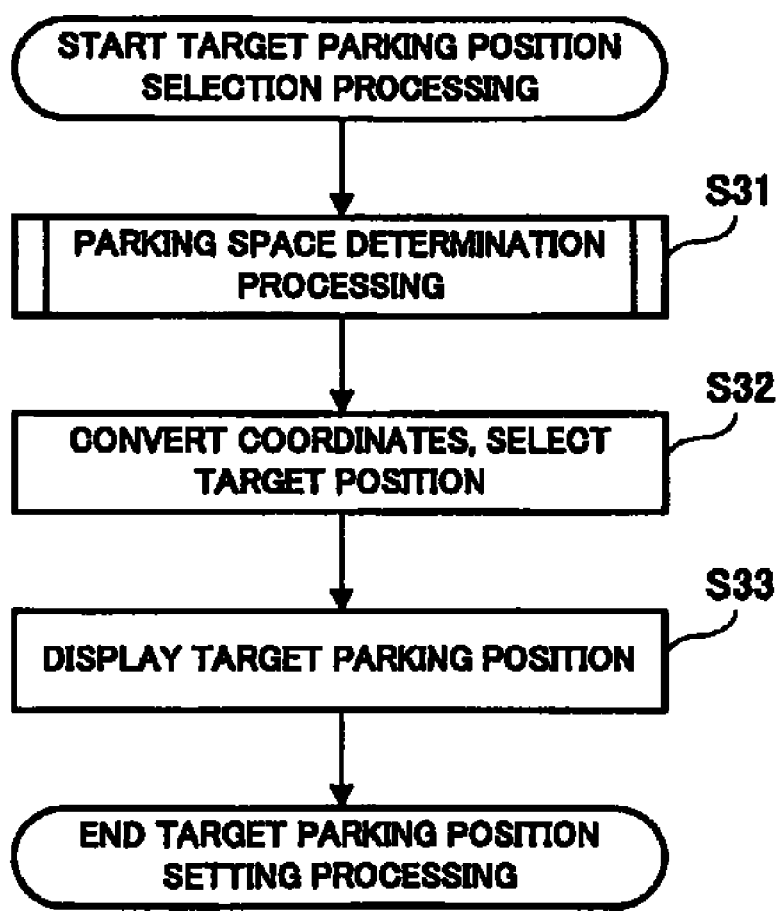
FIG. 7 A flowchart illustrating the target parking position selection processing shown in FIG. 5.
Figure 8:
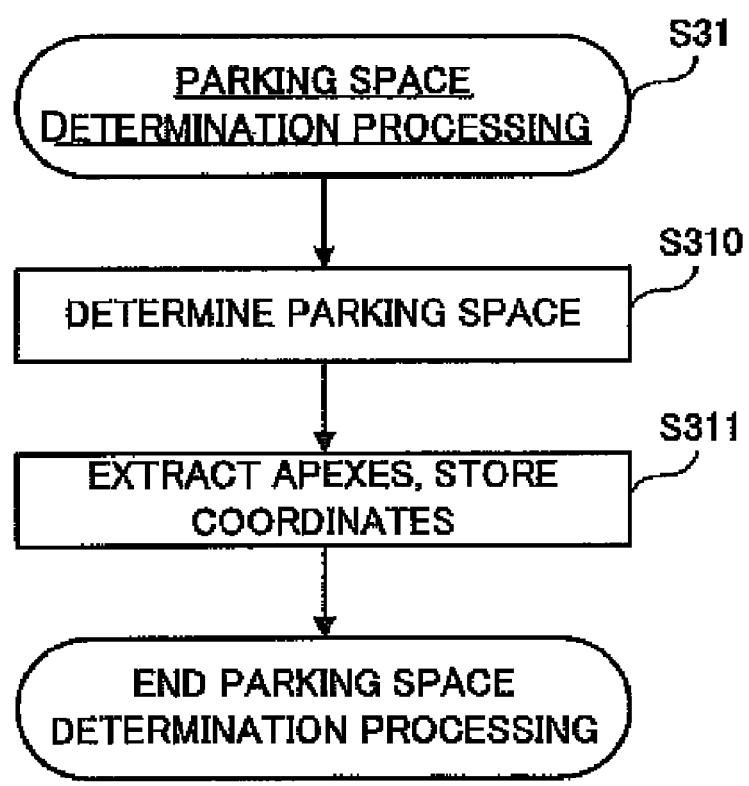
FIG. 8 A flowchart illustrating parking space determination processing shown in FIG. 7.
Figure 10:
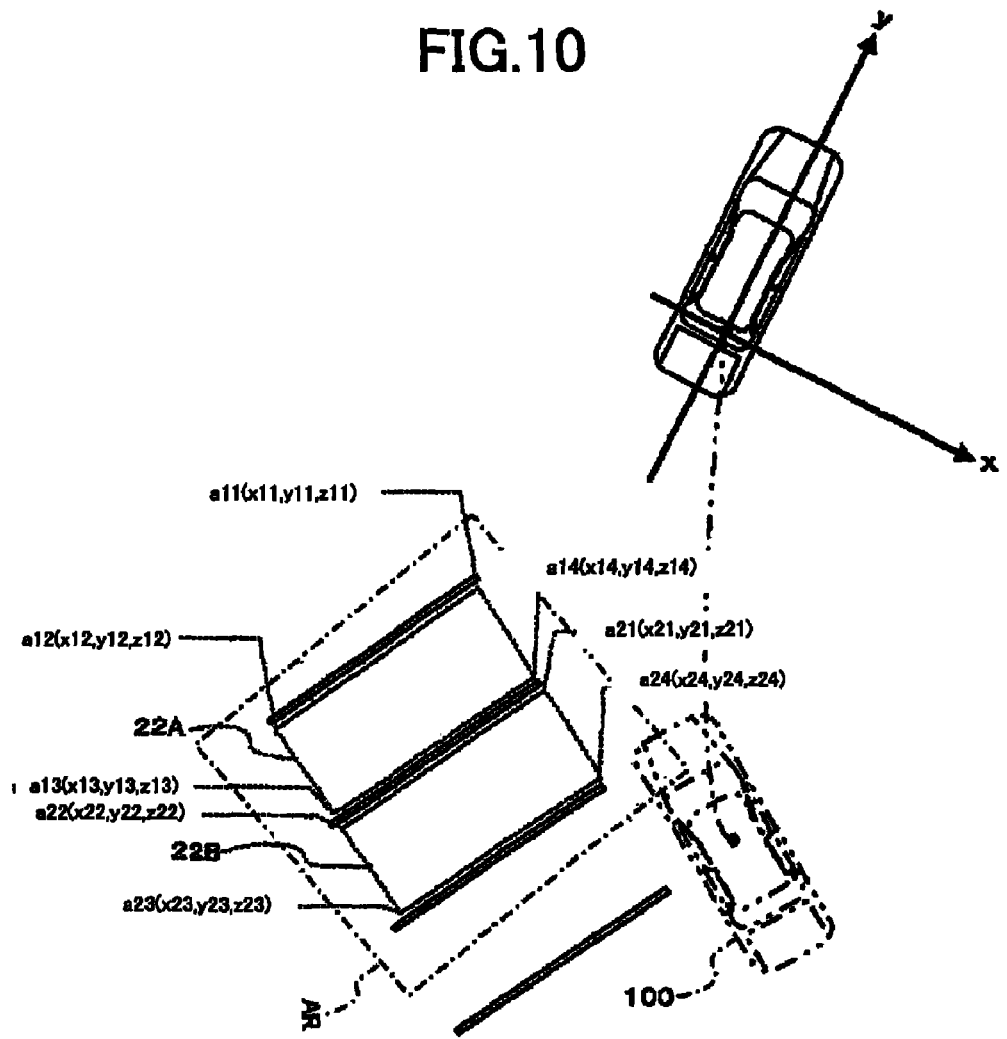
FIG. 10 A view illustrating parking space determination processing shown in FIG. 8.

When this processing begins, as shown in FIG. 7, first, the CPU 11 carries out vehicle space determination processing (step S31). As shown in FIG. 8, in the vehicle space determination processing, the CPU 11 outputs an instruction to take images of the rear of the vehicle to the rear camera 1. Then, as shown in FIG. 10, a world coordinate system x-y (where a widthwise direction of the vehicle is taken to be an x-axis and a main shaft direction of the vehicle is taken to be a y-axis) is set to so as to have the center of the vehicle 100 after movement as an origin and information defining the coordinate system x-y is stored in the RAM 12. Next, a parking space 21 (white lines etc.) is extracted from images taken by the rear camera 1 of the vehicle 100 using image processing technology. The parking section area 22 defined by (stipulated by) the parking space 21 is then discerned (extracted) using publicly known methods (step S310).

The CPU 11 then obtains coordinates for apexes of the parking section area 22 (22A, 22B) determined in step S310 and stores the obtained apex coordinates in the RAM 12. For example, a region taken by the rear camera 1 is taken to be a region AR shown in FIG. 10. The CPU 11 then determines parking section areas 22A and 22B within the region AR and obtains coordinates for the four apexes of these regions. In FIG. 10, coordinates (x11, y11, z11) to (x14, y14, z14), and (x21, y21, z21) to (x24, y24, z24) for the four apexes a11 to a14, a21 to a24 for the two parking section areas 22A and 22B within the region AR are obtained and stored in the RAM 12 (step S311). The parking space determination processing (S31) is then complete, and the CPU 11 proceeds to the next step (step S32).

The CPU 11 then converts coordinates (coordinates in an X Y coordinate system) for the gaze position at which the driver gazes stored in the gaze position storage processing (step S2) to coordinates (coordinates in an x y coordinate system) for after movement of the vehicle 100 from information such as information specifying the movement path P of the vehicle 100 obtained in step S22. After this, the parking section area 22 including the gaze position, of the parking section areas 22 determined in step S310, is determined for selection from the apex coordinates stored in step S311. As a result of this processing, as shown in FIG. 10, even when a number of parking section areas 22 exist on one side (the passenger seat side), one parking section area 22 can be selected from the parking section areas 22 as a target for parking (step S32, FIG. 7).

The selected parking section area 22 is then displayed on the screen of the display device 2 in an emphasized manner. The four apex coordinates of the parking section area 22 selected in step S32 are then converted to two-dimensional coordinates on the display device in order to notify the driver. A publicly known operation method employing a projection transformation matrix etc. is used in the conversion processing.

For example, it is taken that the parking section area 22 B of FIG. 10 is selected. In this case, the apex coordinates (x21, y21, z21) to (x24, y24, z24) of the world (x-y) coordinate system of the parking section area 22B stored in step S311 are converted to coordinates (u21, v21) to (u24, v24) of an image coordinate system (u-v) set on the screen of the display device 2.

Figure 12:
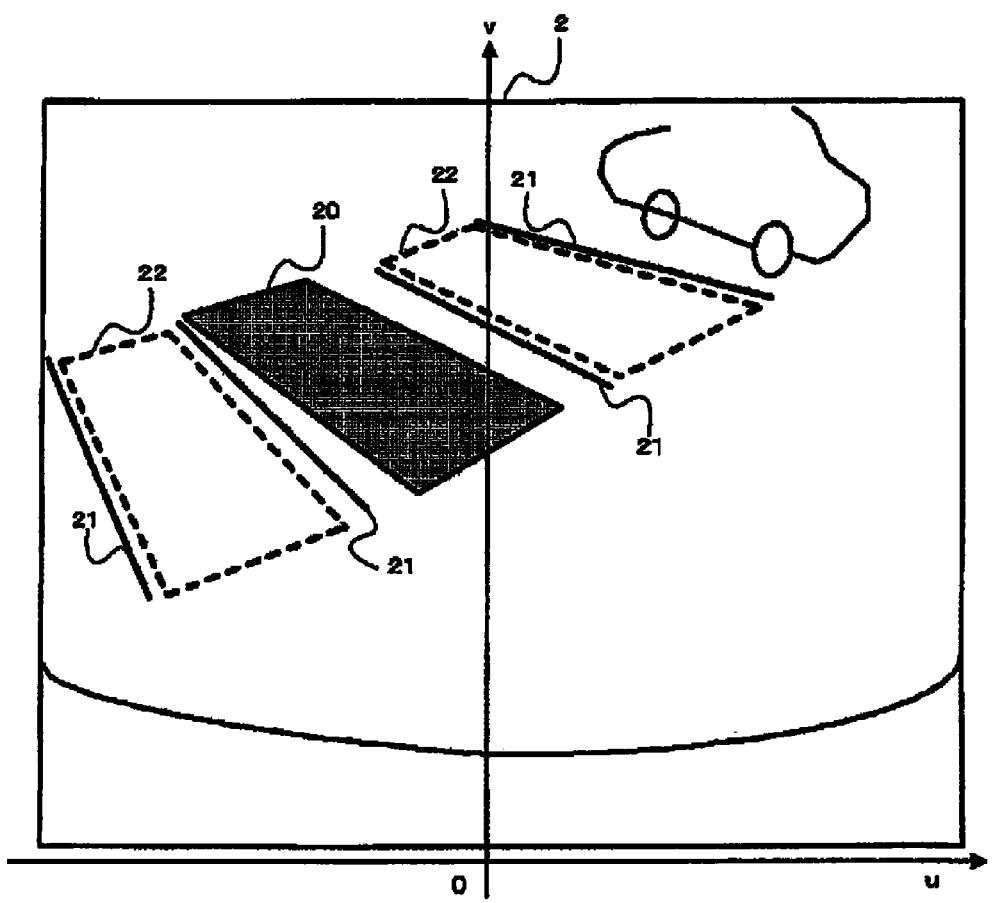
FIG. 12 A view illustrating results of processing in the target parking position selection processing shown in FIG. 7.

The target parking space 20 specifying (emphasizing) the parking section area 22 selected in step S32 of FIG. 7 is then displayed at the display device 2 as shown in FIG. 12 (step S33). The target parking position selection processing then ends and the whole of the target parking position setting processing ends. A display mode for the target parking space 20 can be an arbitrary mode providing that the selected parking section area 22 is emphasized so that the driver is notified in a way that is easy to understand. For example, it is also possible to display a figure of a bold quadrangle indicating the outer edges of the parking section area 22 in a different color to the lines of the parking space 21.

The way in which the parking target position set in this way is utilized is arbitrary. For example, it is also possible for the parking assisting device to guide the driver by calculating a steering procedure for parking at the target parking position from a positional relationship of the current position and orientation of the vehicle 100 and the set target parking position and then displaying a trajectory for the vehicle 100 for up to the target parking position on the display device 2 in a superimposed manner.

Further, it is also possible to automatically steer up to the set target parking position by arranging an automatic steering function at the vehicle 100 and setting a target parking position selected as a target spot for the automatic operation.

According to this embodiment, a parking area is specified without carrying out complex operations, as a result of a driver simply pressing the parking switch 13 at the time of starting a parking operation and gazing at the parking section area 22 wished to park in. The specified parking area can then be utilized in processing for backing into the specified area. It is therefore possible to alleviate the troublesome task of the driver setting the target parking position.

Second Embodiment

The following is a description with reference to the drawings of a parking assisting device of a second embodiment of the present invention.

Figure 14:
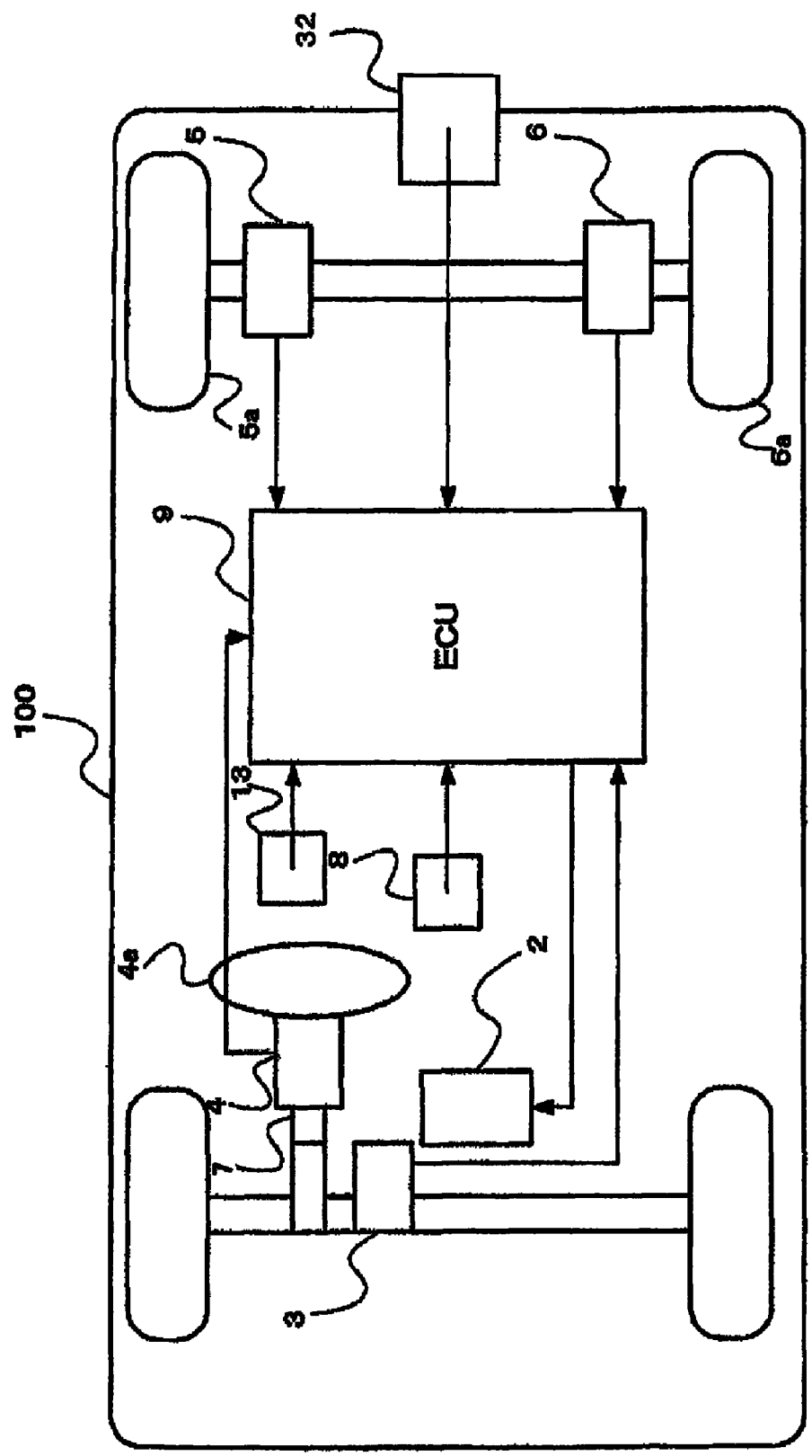
FIG. 14 A view of an overall structure for a vehicle mounted with a parking assisting device of a second embodiment of the present invention.

As shown in FIG. 14, the vehicle 100 equipped with the parking assisting device of the second embodiment of the present invention is provided with an ultrasonic sensor 32, the display device 2, the indoor camera 3, the steering angle sensor 4, the steering wheel 4a, the right rear wheel speed sensor 5, the right rear wheel 5a, the left rear wheel speed sensor 6, the left rear wheel 6a, the steering actuator 7, the reverse position sensor 8, the ECU (Electronic Control Unit) 9, the ROM (Read Only Memory) 320, the CPU (Central Processing Unit) 11, the RAM (Random Access Memory) 12, and the parking switch 13. The vehicle 100 of the second embodiment is the vehicle 100 of the first embodiment with the rear camera 1 removed and the ultrasonic sensor 32 added.

Figure 15:
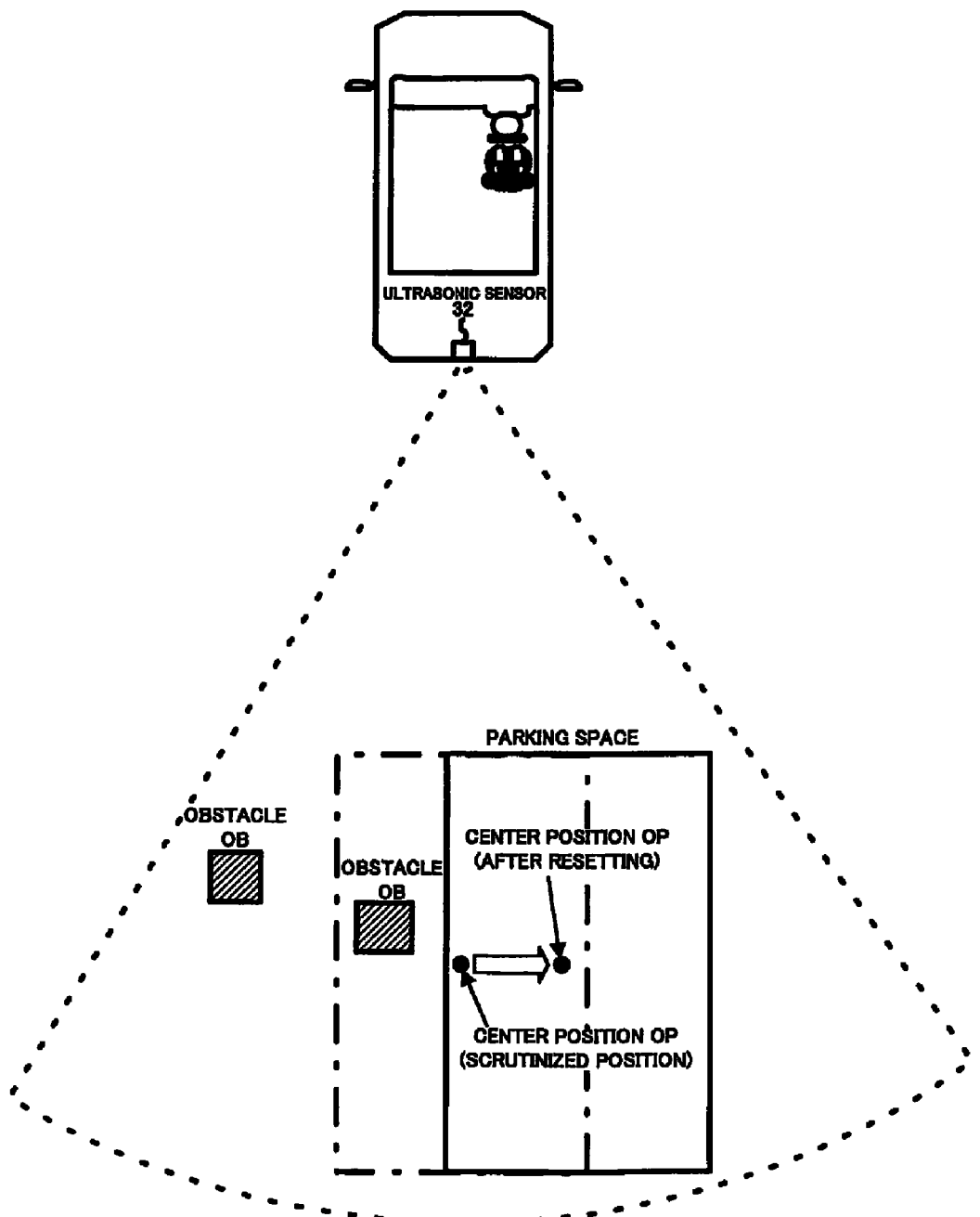
FIG. 15 A view illustrating parking space determination processing by a parking assisting device of the second embodiment of the present invention.

The ultrasonic sensor 32 is located to the rear at substantially the center of the vehicle 100 and is a sensor for detecting obstacles within a predetermined range about the vehicle 100 and to the rear in particular. As shown in FIG. 15, ultrasonic waves are emitted in a predetermined direction to the rear of the vehicle. The ultrasonic sensor 32 then sends the reflection intensity of reflected ultrasonic waves and the receiving direction to the ECU 9.

Figure 16:
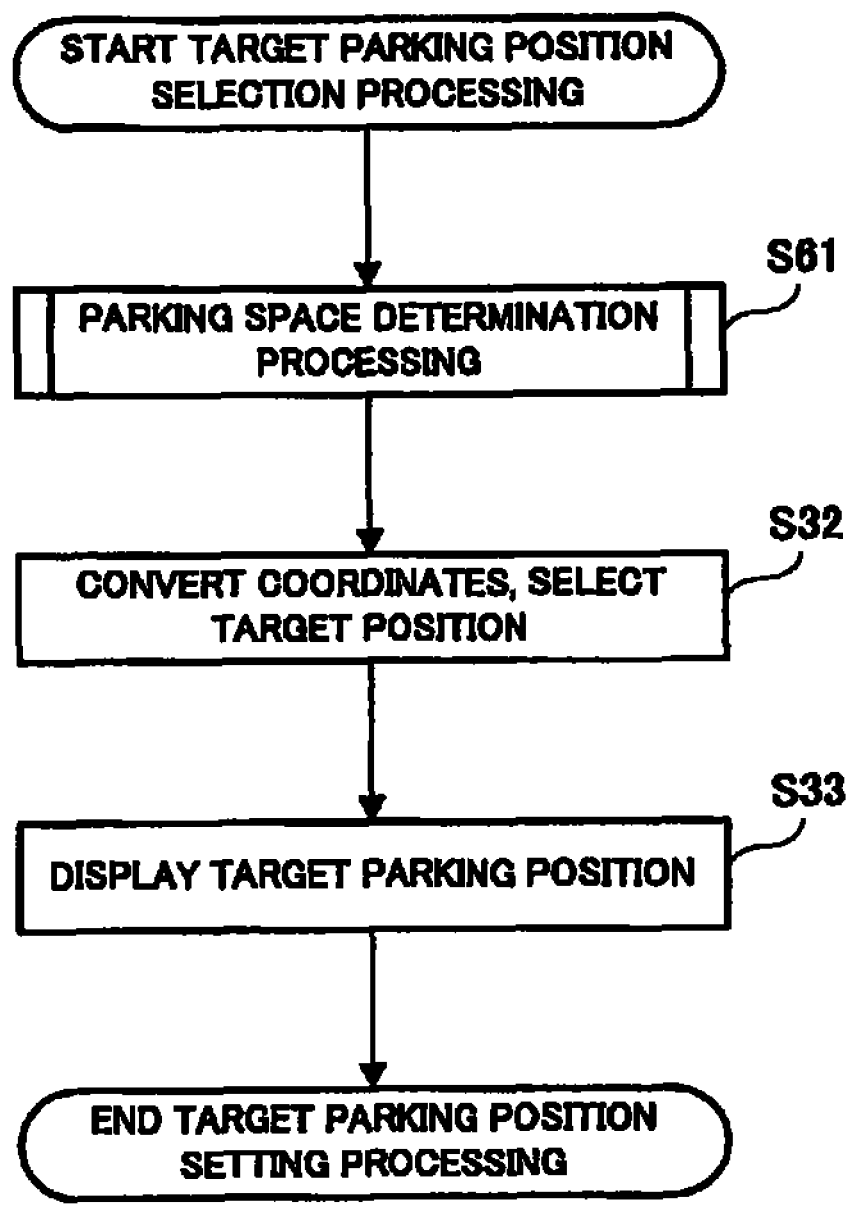
FIG. 16 A flowchart illustrating target parking position selection processing of the second embodiment of the present invention.

A description is now given of the operation of the parking assisting device of the second embodiment. In the second embodiment, as shown in FIG. 16, parking space determination processing (step S61) is executed in place of the parking space determination processing (step S31) referred to in FIG. 8. Other processing is the same as the operation of the parking assisting device of the first embodiment.

Figure 17:
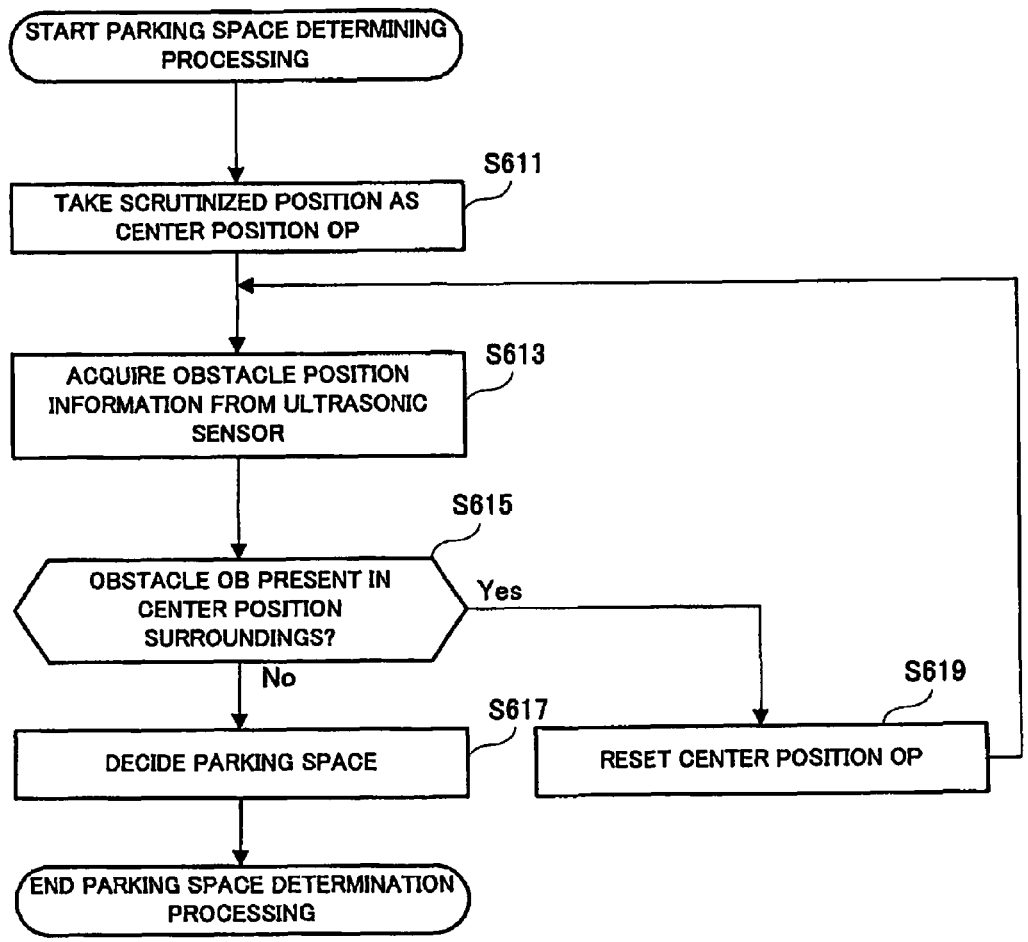
FIG. 17 A flowchart illustrating parking space determination processing of the second embodiment of the present invention.

A flowchart of the parking space determination processing executed by the CPU 11 is shown in FIG. 17. The CPU 11 reads out the coordinates of the gaze position from the RAM 12 for adoption as a center position OP (step S611). The center position OP is a coordinate constituting the center of the parking space. In the parking space determination processing, the CPU 11 acquires reflection intensity of the reflected ultrasonic waves and the receiving direction from the ultrasonic sensor 32. The CPU 11 then acquires the presence or absence of an obstacle OB within a predetermined distance to the rear of the vehicle and the distance and direction to the obstacle OB based on this information and obtains position information such as the coordinates of the obstacle based on this information (step S613).

The CPU 11 then decides predetermined sections taking the center position OP as center based on the obtained position information for the obstacle. This predetermined section is a rectangular section of a size that the vehicle 100 can park in. The CPU 11 then determines whether or not there is an obstacle OB within this predetermined section (step S615). If there is no obstacle OB within a predetermined section (step S615: NO), the CPU 11 shown in FIG. 15 sets a predetermined section taking the center position OP as center as the parking space. The CPU 11 then obtains apex coordinates for the four corners of the parking space for storage in the RAM 12 (step S617). If there is an obstacle OB (step S615: YES), the CPU 11 moves the center position OP a predetermined distance, resets the coordinates of the center position OP (step S619), and returns to step S613.

After step S61, the CPU 11 goes to step S32 and sets the target parking position.

According to the second embodiment, it is possible to extract a parking space where parking is possible and to carry out parking assistance even when a camera is not provided.

This invention is by no means limited to the above embodiments and various modifications and applications are possible.

For example, in the first embodiment, the position at which the driver gazes is set as the parking section area 22 set as the target parking position. However, there are also cases where it is not possible to park the vehicle 100 at the position at which the driver gazes due to the position or orientation of the vehicle 100 or where the path for parking is extremely complex (for example, the path may turn many times). In such cases it is preferable to give notification that parking to the designated position is difficult.

For example, in this case, in step S32 of FIG. 7, the parking assisting device 100 determines the position (position A(X0, Y0, Z0) of FIG. 9) that driver specified by gazing as the target parking position. The parking section area 22 including this position is then determined. Next, it is determined whether or not parking is possible with a straightforward path (where there is no turn) at the parking section area 22 taken as the target, from the parking section area 22 for which the current vehicle position and orientation (point of origin) are determined. The determination itself is publicly known.

When it is determined that parking is possible, the parking section area 22 is selected as the target parking position (step S32), and the selected parking section area 22 is displayed in an emphasized manner (step S33). When it is determined that parking is not possible, the neighboring parking section area 22 where parking is possible is selected as the target parking position, and selection can be invited using a selection key explained in the following.

Figure 13:
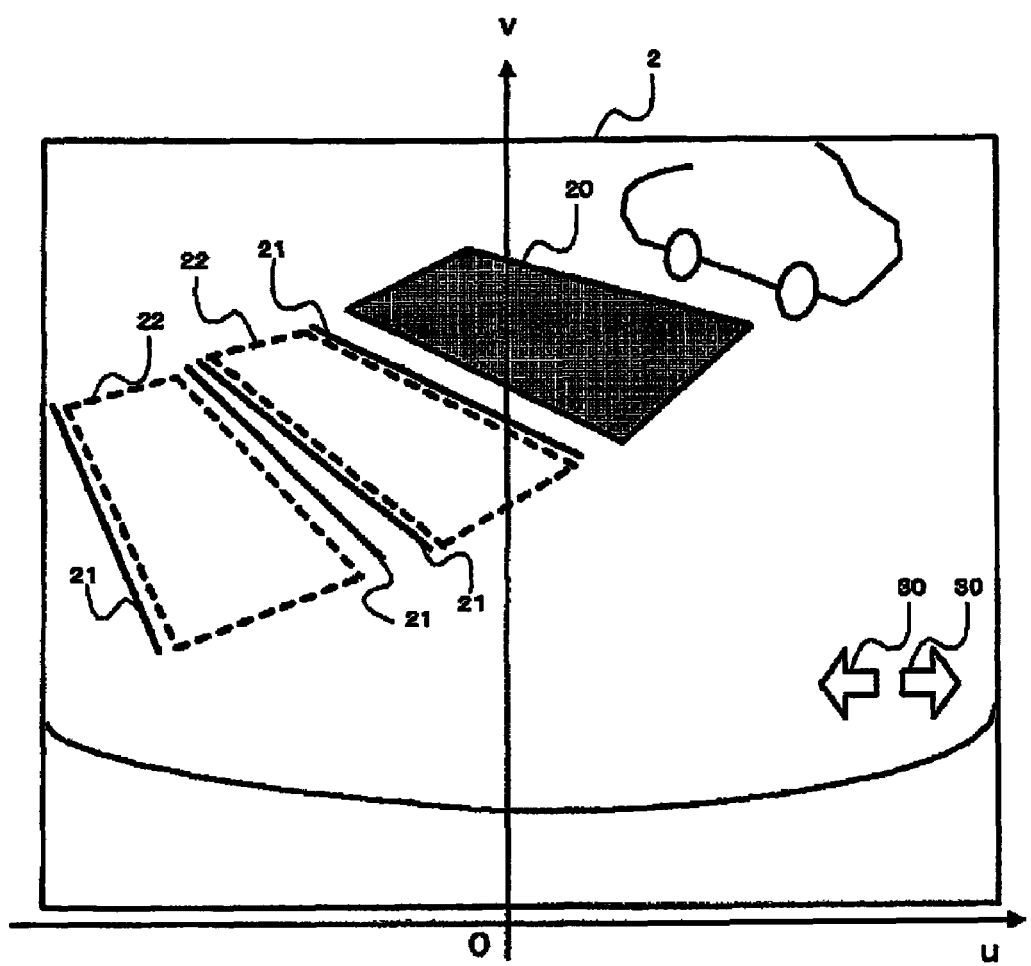
FIG. 13 An example showing changes to the target parking position.

Further, in the first embodiment, the target parking position is set automatically by detecting the position at which the driver gazes. However, this is by no means limiting, and it is also possible to set a section as a target parking position candidate selected by the driver gazing, and then carry out confirmation processing and resetting processing as a result of the driver performing key operations or performing input operations using a touch-sensitive panel. For example, as shown in FIG. 13, after displaying the parking space 21 selected by gazing the display device 2 as a provisional target parking position, arrow keys etc. are displayed at the screen, and sequentially neighboring parking spaces 21 may be selected as target parking positions from the parking spaces 21 determined in step S31, according to the orientation of the operated arrow keys.

The method for determining the gaze position is arbitrary. For example, it is possible to acquire a facial image of 30 frames per second, separately count the gaze time and number of times of gazing in the direction at which the driver gazes from the facial image, and determine positions by gazing that are positions at which the driver gazes for a long time or positions at which the driver gazes the maximum number of times. It is also possible to determine the direction of gazing by directly measuring the orientation of the eyeballs of the driver without this depending on the image processing.

Further, in the above embodiments, the gaze position is determined by the driver's pressing the parking switch 13 and gazing at the ground surface for a fixed time. However, this is by no means limiting, and it is also possible, for example, to start processing to determine a gaze position using the voice of the driver rather than the parking switch 13 by using a device capable of voice recognition etc. Similarly, it is also possible to determine predetermined acts and conduct by the driver from the image and take the opportunity to detect the target parking position. Further, when there are a number of target parking position candidates, it is possible to set one target parking position from the target parking position candidates using the voice of the driver. Alternatively, if a camera is also provided at the front part of the vehicle and the target parking position is not a position where parking is possible, a configuration that notifies the driver to this effect can also be adopted.

In the second embodiment, the camera is removed and the ultrasonic sensor is then provided but it is also possible to provide the ultrasonic sensor together with the camera and then detect both the parking space and obstacles. Any type of sensor other than the ultrasonic sensor that is capable of detecting obstacles such as a distance sensor using millimeter waves or a laser can also be adopted.

In the first embodiment, the parking space 21 is constituted by a pair of white lines, but a parking space constituted by a rectangular frame, for example, can also be used. The color, thickness, and shape etc. of the lines constituting the frame are arbitrary.

This application is based on Japanese Patent Application No. 2005-333419 filed on Nov. 17, 2005. The specification, scope of the patent claims, and diagrams of Japanese Patent Application No. 2005-333419 are hereby incorporated in their entirety by reference in this specification.

INDUSTRIAL APPLICABILITY

As shown above, the parking assisting device of the present invention is useful in that it is possible to set a position as a target parking position simply by gazing at the position. Use in combination with parking assisting devices providing parking assistance using audio or a screen display and parking assisting devices that controls a vehicle to travel automatically to a target position is therefore possible.

The invention claimed is:

1. A parking assisting device comprising:
an imager that takes images of surrounding of a vehicle;
a gaze position determiner that determines a gaze position at which a driver gazes;
a target parking position setter that sets a target parking position based on images taken by the imager and the gaze position determined by the gaze position determiner; and
a parking assistor that assists in processing to park the vehicle at the target parking position set by the target parking position setter.

2. The parking assisting device according to claim 1, further comprising a possible parking position determiner that detects at least one parking space from the images taken by the imager, obtains a parking section area from the detected parking spaces, and determines whether or not it is possible to park the vehicle within the obtained parking section area,
wherein the target parking position setter sets a parking section position on a position which the gaze position determiner to be a position at which the driver gazes, of the parking section areas where parking is determined to be possible by the possible parking position determiner, as the target parking position.

3. The parking assisting device according to claim 1, further comprising parking section area detector that detects parking section areas where it is possible for a vehicle to park,
wherein when the parking section area detector detects a plurality of parking section areas, the target parking position setter sets a parking section area on the gaze position determined by the gaze position determiner from a plurality of possible parking positions as the target parking position.

4. The parking assisting device according to claim 2, further comprising:
a parking starter that inputs an instruction to start parking;
a storage that determines movement of a vehicle from the input of an instruction to start parking to a vehicle position at the time when the vehicle is in a reversing state and stores the movement; and
a relative position acquirer that acquires a relative position of the vehicle position at the time when the gaze position determiner determines the gaze position, with respect to the vehicle position at the time when the vehicle is in the reversed state;
wherein the target parking position setter selects a position from a plurality of possible parking positions and sets the selected position as the target parking position based on the gaze position determined by the gaze position determiner and the acquired relative position.

5. The parking assisting device according to claim 2, wherein the parking assistor further comprises any of:
a display that displays the target parking position;
a guide that guides the vehicle to the set target parking position; and
an automatic steerer that controls the vehicle to automatically travel as far as the target parking position.

6. The parking assisting device according to claim 2, wherein the target parking position setter comprises a switching operator that switches the selected target parking position to other possible parking position.

7. The parking assisting device according to claim 1, the gaze position determiner comprising:
- an internal imager that takes images of a space in the vehicle including the face of the driver; and
- a gaze position calculator that obtains the gaze position at which the driver gazes from the images of the driver taken by the imager.

8. The parking assisting device according to claim 2, further comprising:
- a parking starter that inputs an instruction to start parking;
- a storage that stores movement of a vehicle from the start of parking to a vehicle position at the time when the vehicle is in a reversing state; and
- relative position acquirer that acquires a relative position of the vehicle position at the time when the gaze position determiner determines the gaze position, with respect to the vehicle position at the time when the vehicle is in a reversing state;
- wherein the target parking position setter selects a position from a plurality of possible parking positions based on the gaze position determined by the gaze position determiner and the relative position.

9. The parking assisting device according to claim 2, further comprising a display that displays the images taken by the imager,
- wherein the display displays a parking section area set as the target parking position by the target parking position setter in an emphasized manner.

10. The parking assisting device according to claim 2, further comprising:
- a display that displays images of a plurality of parking section areas taken by the imager and displays one of the plurality of parking section areas in an emphasized manner;
- emphasis target switcher that switches over an emphasis target; and
- target setting operator for setting the emphasis target,
- wherein the display switches over the emphasized parking section area in response to the operation of the emphasis target switcher, and
- the target parking position setter sets the parking section area displayed in an emphasized manner at this time as the target parking position in response to the switching operation of the emphasis target switcher.

11. A parking assisting method comprising:
taking images of the surrounding of a vehicle;
determining a position at which a driver gazes by a processor;
setting a target parking position based on taken images and a determined gaze position by the processor; and
outputting information for guiding driving to enable parking at the set target parking position, or controlling the vehicle to travel automatically to the target parking position by the processor.

12. A parking assisting device comprising:
- an obstacle detector that detects position information of obstacles of surrounding of a vehicle;
- a gaze position determiner that determines a gaze position at which a driver gazes;
- a target parking position setter that sets the target parking position based on position information for the obstacles detected by the obstacle detector and the gaze position determined by the gaze position determiner; and
- a parking assistor that assists in processing for parking the vehicle at the target parking position set by the target parking position setter.

* * * * *